INVENTORS
Gerhard Hecht &
Heinz Wellhausen

BY Spencer & Kaye
ATTORNEYS

Feb. 28, 1967 G. HECHT ETAL 3,306,981

CODING AND RECEIVING CIRCUITS FOR COMPATIBLE STEREOPHONIC BROADCAST SYSTEMS

Filed Sept. 4, 1964 6 Sheets-Sheet 2

INVENTORS
Gerhard Hecht &
Heinz Wellhausen
BY Spencer & Kaye
ATTORNEYS

INVENTORS
Gerhard Hecht
Heinz Weilhausen
BY Spencer & Kaye
ATTORNEYS

INVENTORS
Gerhard Hecht &
Heinz Wellhausen
BY Spencer & Kaye
ATTORNEYS

Feb. 28, 1967 G. HECHT ETAL 3,306,981

CODING AND RECEIVING CIRCUITS FOR COMPATIBLE STEREOPHONIC BROADCAST SYSTEMS

Filed Sept. 4, 1964 6 Sheets-Sheet 5

INVENTORS
Gerhard Hecht &
Heinz Wellhausen
BY Spencer & Kaye
ATTORNEYS

INVENTORS
Gerhard Hecht &
Heinz Wellhausen
BY Spencer & Kaye
ATTORNEYS

United States Patent Office
3,306,981
Patented Feb. 28, 1967

3,306,981
CODING AND RECEIVING CIRCUITS FOR COMPATIBLE STEREOPHONIC BROADCAST SYSTEMS

Gerhard Hecht, Hannover, and Heinz Wellhausen, Hannover-Linden, Germany, assignors to Telefunken Patentverwertungsgesellschaft m.b.H., Ulm (Danube), Germany Filed Sept. 4, 1964, Ser. No. 394,531
Claims priority, application Germany, Sept. 5, 1963, T 24,653; Nov. 20, 1963, T 25,182; Apr. 4, 1964, T 25,931
16 Claims. (Cl. 179—15)

The present invention relates to a coding circuit for compatible broadcast multiplexed stereophonic transmission; more particularly to a coding circuit which generates left and right channel output signals from the whole stereophonic signal by time-multiplexing the latter at a rate equal to the intermediate carrier frequency. The coding circuit may be adapted for use in transmitters also.

For compatible stereophonic reception, use is made, as is well known, of a summation channel (also known as a middle channel or sound channel) and a difference channel (also called side channel or direction channel). The channels may be derived either from microphones suitable for the purpose (with spherical or figure-eight characteristics), or by forming the sum and difference of the outputs of ordinary microphones.

A well-known method of stereophonic broadcasting involves modulating the main carrier of the transmitter in the following manner: (1) with the sum signal $F_S$, (2) with an intermediate carrier frequency (38 kcs.) on which the difference signal $F_D$ is amplitude modulated with suppressed carrier (hereinafter referred to as "intermediate carrier signal"), and (3) with a pilot frequency (19 kcs.) of half the intermediate carrier frequency.

There are two methods known for recovering the audio channels at the receiving end. In the first method the three modulation components are separated from one another by means of filters. Then the pilot frequency, after being doubled in frequency, is added to the intermediate carrier signal; this mixture is demodulated by rectifying, in the usual way, so that the difference signal $F_D$ is produced. Finally, from the sum signal $F_S$ and the difference signal $F_D$, by sum and difference formation in a so-called matrix, the right and left hand channels (the two loud-speaker channels) are obtained.

The second receiving method is based on the known fact that a frequency multiplex process with direct transmission of the sum signal (i.e., by direct modulation of the main carrier) and with amplitude modulation of the intermediate carrier by the difference signal, is identical in result to a time multiplexing of the right and left hand channel signals, where the channels are alternated at the frequency of the intermediate carrier, and all harmonics and modulation products of the multiplexing frequency are suppressed (Audio, June 1961, pages 21–23). This holds true if the condition is satisfied, for the first-mentioned process, that the right and left channel signals have the same amplitude in the sum signal as they do in the intermediate carrier. In the second method, from the total stereophonic signal obtained by demodulation of the received high frequency, only the pilot frequency (19 kcs.) is filtered out. It is doubled (38 kcs.), and with it the remaining stereophonic signal (i.e., the sum signal $F_S$ and the intermediate carrier signal) is demodulated. The demodulation is carried out by alternately feeding the latter two signals to the two output channels, the alternation occurring at the frequency of the intermediate carrier. This is carried out using a beam switching tube (Electronics, August 19th, 1961, pages 45–57, Figure 3). With this type of demodulation, the sum and difference operations required to obtain the two loud speaker channels are automatically and inherently performed. However, this operation requires that the sum signal be added to the two outputs of the beam tube, in opposite phase and with a predetermined amplitude (from the cathode of the beam tube), so that the necessary amplitude ratio for proper sum and difference formation is present. This method of demodulation has the advantage that the filters mentioned for the first method (and the devices thereby required for balancing out the difference in transit time in the sum and difference channels) are dispensed with; moreover, disturbances in the pilot frequency (19 kcs.) can not reach the output. In addition, disturbances of the even harmonic of the intermediate carrier (38 kcs.) do not come through because the tube, in spite of the sinusoidal shape of the intermediate carrier, switches over practically instantaneously, and an alternating voltage in the form of a square wave, which this is, contains only odd harmonics. There is, however, a drawback in that as an electronic switch, the aforementioned special beam deflection tube is needed, so that the cost is very much higher than that required for the first method.

It is well known that such a beam deflection tube can be replaced by a double push-pull circuit arrangement using diodes (in the manner of a ring demodulator) to one diagonal of which the intermediate carrier is fed and from the other diagonal of which, across decoupling resistors, the two loud-speaker signals are tapped to ground. The greater amplitude of the sum signal over the difference signal is compensated for by feeding a certain amount of the low frequency sum signal to both loud-speaker channels.

It has been found that in the practical application of this decoding circuit, using switching diodes, trouble arises due to the fact that the amplitude of the switching signal (38 kcs.) is very much greater—and indeed five times as great—as the signal to be switched (the whole stereophonic signal without the pilot frequency) has to be, if distortion is to be sufficiently small. Since, however, the diodes only tolerate a determined loss output, the amplitude of the switching signal should not exceed a predetermined value. Thus, the maximum amplitude of the whole stereophonic signal which can be handled by the diodes is given in advance. In practice, the amplitude of the whole stereophonic signal furnished by the ratio detector of the receiver is so great (about 2 v.) that it is necessary to operate close to the above-mentioned ratio (1:5) and therefore at the overmodulation limit of the diodes. It is moreover necessary to raise the amplification of the amplifier stage for the intermediate carrier frequency (obtained by filtering out the pilot signal and doubling its frequency) by means of positive feedback to a value high enough so that the amplitude of the switching signal is adequately large.

It is therefore an object of the present invention to provide apparatus for carrying out the above-described decoding method without the drawbacks of the previously known apparatus.

It is a further object of the present invention to provide apparatus for decoding a time-multiplex stereo signal, wherein the multiplexing switch is a multiple-transistor switch.

It is another object of the present invention to provide apparatus for carrying out the above-mentioned method, wherein the required amplification of the intermediate carrier is considerably less than that of prior art devices.

It is still another object of the present invention to provide a device for carrying out the above-mentioned method, wherein the transistors comprising the multiplexing switch need not be matched to one another.

It is a further object of the present invention to provide a decoder for multiplex stereophonic signals, which can be used for monaural reception with no switch-over operation, so that the switch transistors introduce no distortion into the monaural signal, maintaining a high signal to noise ratio.

Additional objects and advantages of the present invention will become apparent upon consideration of the following description when taken in conjunction with the accompanying drawings in which:

FIGURE 6 illustrates such as circuit wherein the transistors are open in the state of rest, or undriven state, and are periodically driven to the blocking state.

FIGURES 7 to 9 illustrate circuits similar to FIGURE 6, wherein the transistors block the incoming signal in the state of rest, and are periodically driven to the open (in the gating sense) state.

Figure 1:
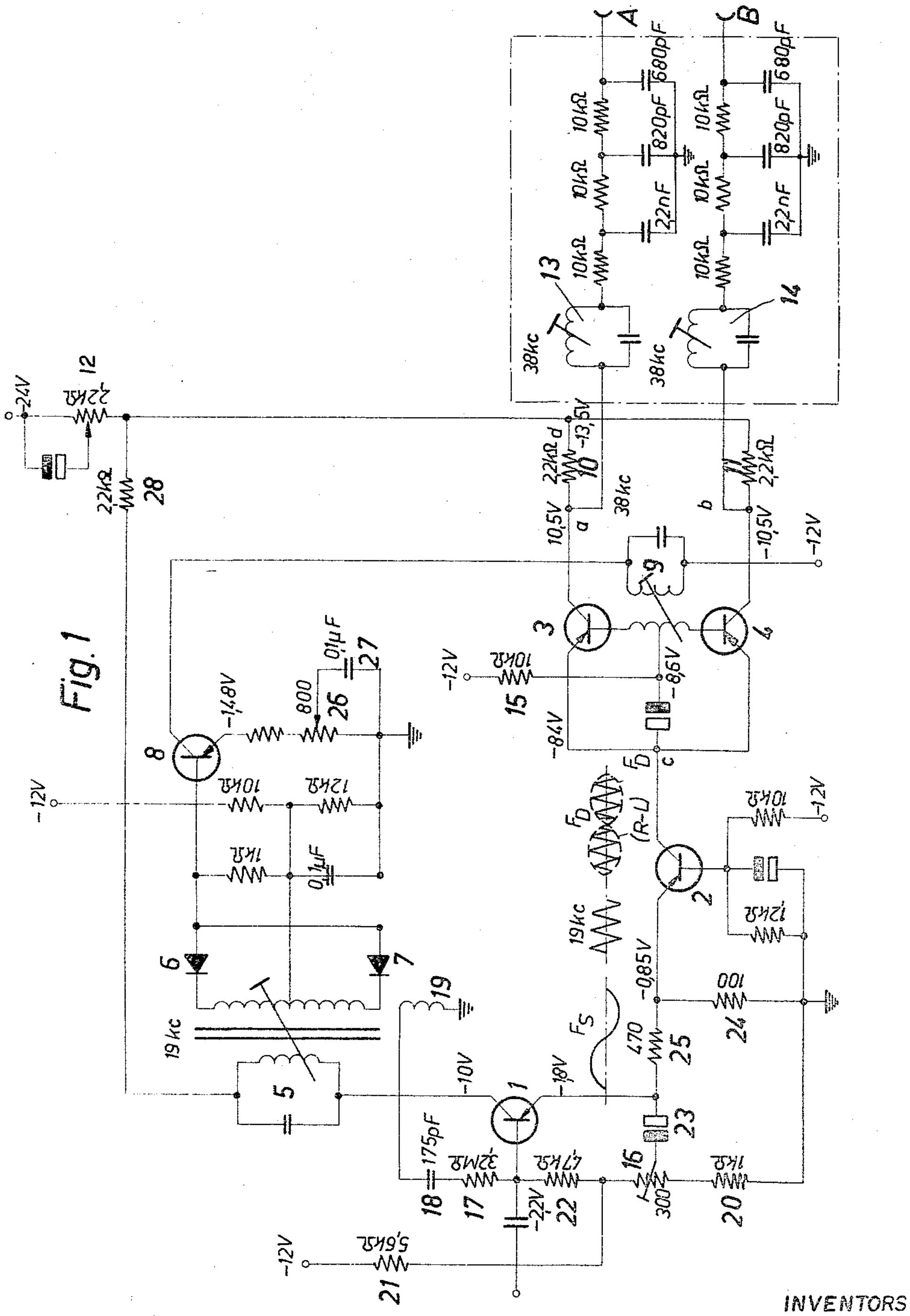
FIGURE 1 shows schematically a decoder designed according to the invention, including two switching transistors in a push-pull circuit.

On the left, in the circuit of FIGURE 1, the signal demodulated by the ratio detector of the receiver (not shown) and tapped before the familiar de-emphasis device is fed to the transistor 1; on the right the two loudspeaker channels A and B are tapped. The whole stereopohnic signal arriving from the ratio detector also appears with almost no amplitude loss, at the emitter of the transistor 1, and is then passed via the transistor 2 to the emitters of the two switching transistors 3 and 4.

The three components of the whole stereophonic signal are schematically shown directly above transistor 2. They are the low-frequency sum signal $F_S$ (i.e., of the sum of the right-hand signal R and the left-hand signal L), the 19 kcs. pilot frequency $F_P$ (which is indeed no longer needed here, but does not do any harm), and the intermediate carrier signal which consists of the intermediate carrier of 39 kcs. amplitude modulated by the low-frequency difference signal $F_D$, with suppressed carrier. The envelope shown on the horizontal axis is the difference signal $F_D$ (i.e., the difference between the right-hand signal R and the left-hand signal L).

From the whole stereophonic signal at the collector of the transistor 1, the resonant circuit 5 filters out the pilot frequency of 19 kcs., which is then doubled in frequency by means of the rectifiers 6 and 7. Freqency doubling by means of diodes has the following advantage over frequency doubling with the aid of non-linear vacuum tube characteristics: the ratio between the voltage of the intermediate frequency carrier obtained by the former method, and the voltage of the pilot frequency signal, is practically independent of the amplitude of the input signal, so that the ratio can be pre-set to its optimum value. This form of frequency doubling also contributes to providing an optimum demodulator.

Moreover, the drawbacks of a locked oscillator for frequency doubling are eliminated. The intermediate carrier obtained by frequency doubling is amplified by transistor 8 and fed via the resonant circuit 9 to the base electrodes of the two switching transistors 3 and 4.

The stereophonic signal which appears between the point *c* and ground is therefore connected alternately to points *a* and *b*, the connection changing at a rate equal to the intermediate carrier frequency. Moreover, it appears at *a* and *b* through the collector resistances 10 and 11. In this way, therefore, the sum signal $F_S$ reaches points *a* and *b* alternately.

Thus the signal amplitude at points *a* and *b* is about half the amplitude of the signal at *c*.

The intermediate carrier signal, however, reaches the output in another way. During the first half cycle of the envelope $F_D$ the half-cycles of the high frequency signal thereunder are connected alternately to outputs *a* and *b*, by virtue of the intermediate carrier signal, which is in phase with the high frequency signal. Therefore, the positive half-cycles of the high frequency appear in a positive direction at one output and the negative half-cycles in a negative direction at the other output. The mean amplitude of the high-frequency half-cycles is about equal to a third of the amplitude of the high frequency oscillations at the point *a*, and represents the first half cycle of the low frequency signal $F_D$. During the other half cycle of the envelope $F_D$, the high-frequency half cycles are connected with reversed polarity to the two outputs, for at the point of constriction of the envelope, it is well known that a phase change of 180° occurs in the high frequency oscillations. In this way, the other half cycle of the low frequency signal $F_D$, with the correct phase, is produced at the points *a* and *b*.

Due to the fact that there is an amplitude ratio between the two signals $F_S$ and $F_D$ of 3 to 2, a portion of the $F_S$ signal is fed to the outputs *a* and *b* in phase opposition to the $F_S$ signal which would otherwise appear there. It is tapped from the non-capacitively-bridged part of resistor 12 in the collector circuit of transistor 1, at which there appears a voltage in phase opposition to the voltage at the emitter. The voltage $F_S$ in phase opposition is preferably connected, in contrast to the circuit arrangements heretofore known, to the point *d*; then, since additional ohmic resistors are eliminated, low impedance outputs A and B are obtained. The advantage of this is that the output voltage is largely independent of the load.

What is more, since stray capacities are small, the compensation is exactly effective in the low frequency band. The danger of interference through hum is also minimized. To pass the compensating voltage to the point *d*, it is nevertheless essential to connect an additional transistor 2 between transistor 1 and the switching transistors 3 and 4. Since the compensating signal comes from the same source of voltage as the whole stereophonic signal a series connection of the whole stereophonic signal and the compensating voltage is possible only with the interposition of a balancing-out stage. The balancing-out transistor 2 provides amplification at the same time, so that in lieu of the attenuation otherwise obtained, loss-free transmission through the decoder is possible. It was formerly necessary to connect an amplifier stage to each of the channels A and B to compensate for the losses in the stereophonic signal.

The above-mentioned compensation is set roughly by means of the slide on the resistor 12. With correct compensation, cross-talk between the two channels A and B is at a minimum. For the fine adjustment of the compensation, use is made of the potentiometer 16 in the base circuit of transistor 1, with which the value of the feedback around transistor 1 and therefore its amplification is adjusted.

The two resonant circuits 13 and 14 at the output of the decoder are tubed to 38 kcs. and serve, together with the following RC networks, for suppressing this frequency. The RC networks also provide de-emphasis, in the well-known manner.

The emitter electrodes for the two transistors 3 and 4 are biassed, via resistance 15, with so high an initial current that both the transistors are fully conducting in the absence of the intermediate carrier. Therefore, a monaural signal passes to the two outputs A and B, since no switching-over is necessary, with no distortion and no reduction of the signal-to-noise ratio.

Some details of the circuit arrangement of the drawing will be described here, first of all with respect to input transistor 1.

The components 17, 18, and 19 serve to compensate for the base-collector capacity of transistor 1.

The base voltage divider for the transistor 1 includes the resistances 20, 16 and 21, and is separated from the base in a well-known manner by the resistance 22 in order not to load the input by the base voltage divider. At the same time, the bottom point of the resistance 22 is connected via the upper part of the resistance 16 and the condenser 23 to the emitter, so that the input is not loaded by the resistance 22.

In order to obtain approximately the correct value of the compensating voltage, a portion of the current (alternating current) from transistor 1 is passed through the resistance 24 at the input of the transistor 2. In order to have a sufficiently great feedback for the transistor 1, the resistance 25 is also included.

To adjust the amplitude of the switch control current, use is made of the potentiometer 26 in the emitter circuit of transistor 8, with which an adjustable portion of the emitter resistance can be short-circuited by the condenser 27.

The resistance 28 is designed to protect the transistor 1 from overloading, because the supply source has the relatively high voltage of 24 v.

FIGURES 2 to 5 relate to embodiments wherein the two switching transistors are supplemented by two further switching transistors to form a double push-pull circuit, and the filter circuits for suppressing the intermediate carrier in the two loudspeaker channels are omitted. The intermediate carrier is already suppressed by the double push-pull circuit, so that the filters are not necessary.

Figure 3:
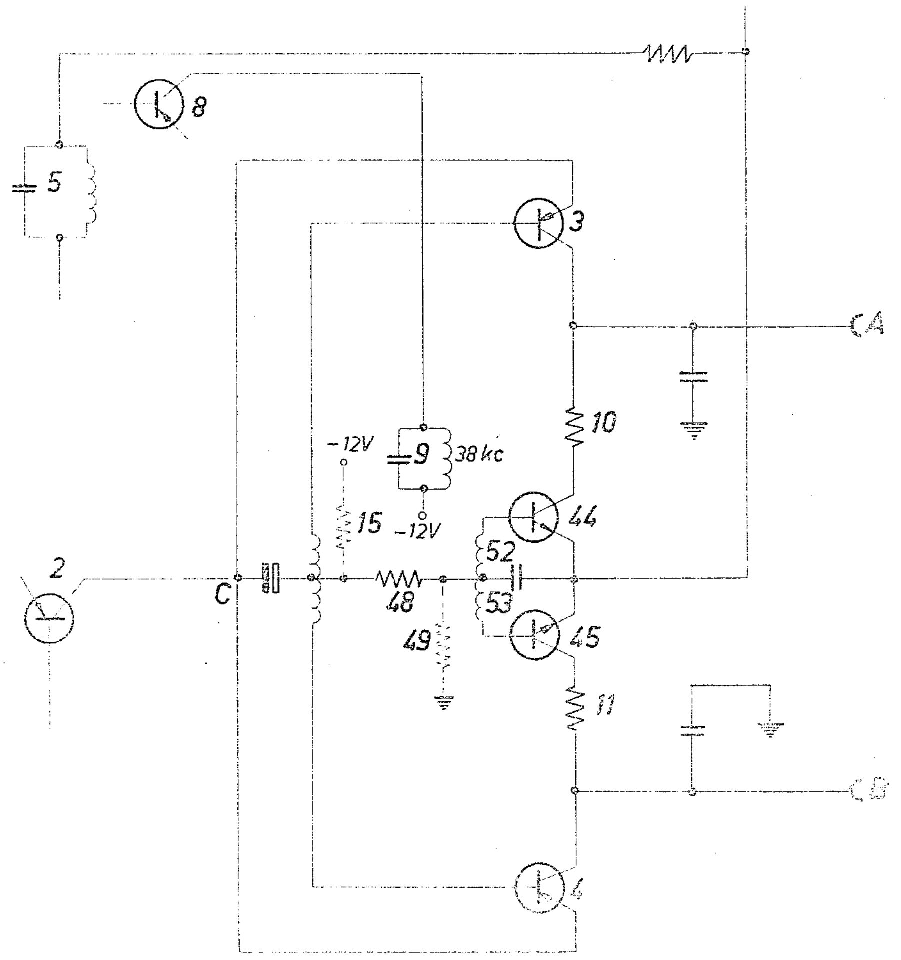
FIGURE 3 illustrates a further modification of the circuit of FIGURE 2.
Figure 4:
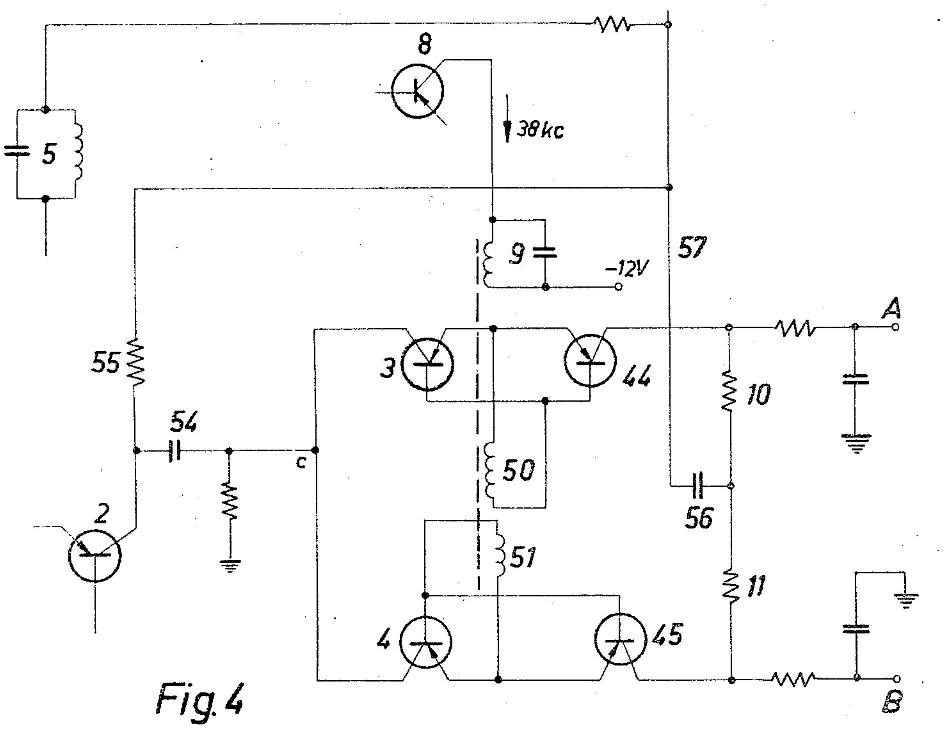
FIGURE 4 is still another modification of the circuit of FIGURE 2.
Figure 5:
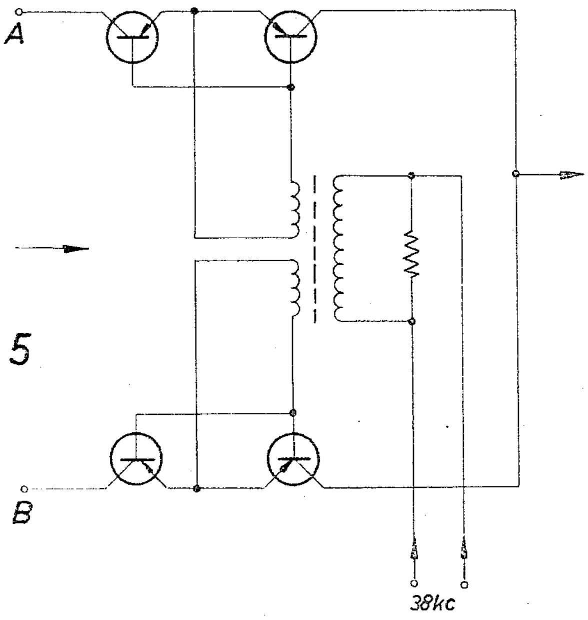
FIGURE 5 shows a coding circuit for sterophonic transmitters, wherein four transistors are used in a double push-pull circuit.

In FIGURES 4 and 5 the four transistors of the double push-pull circuit are only operated as alternating current switches, without direct current. In each of the two channels (A, B) two transistors with opposite polarity of the emitter-collector path are connected in series. The base electrodes of these two transistors are connected together and controlled by the intermediate carrier. The advantage of the circuit arrangements of FIGURES 4 and 5 over those of FIGURES 2 and 3 is that separate control windings for the base electrodes of two of the transistors are eliminated so that no more windings are needed than for a single push-pull circuit arrangement with two transistors.

Decoding circuits designed according to the invention can also be used as modulators in transmitters for stereophonic broadcasts by changing the direction of transmission. FIGURE 5 shows an example of such a circuit used as a coding circuit for a transmitter.

Figure 2:
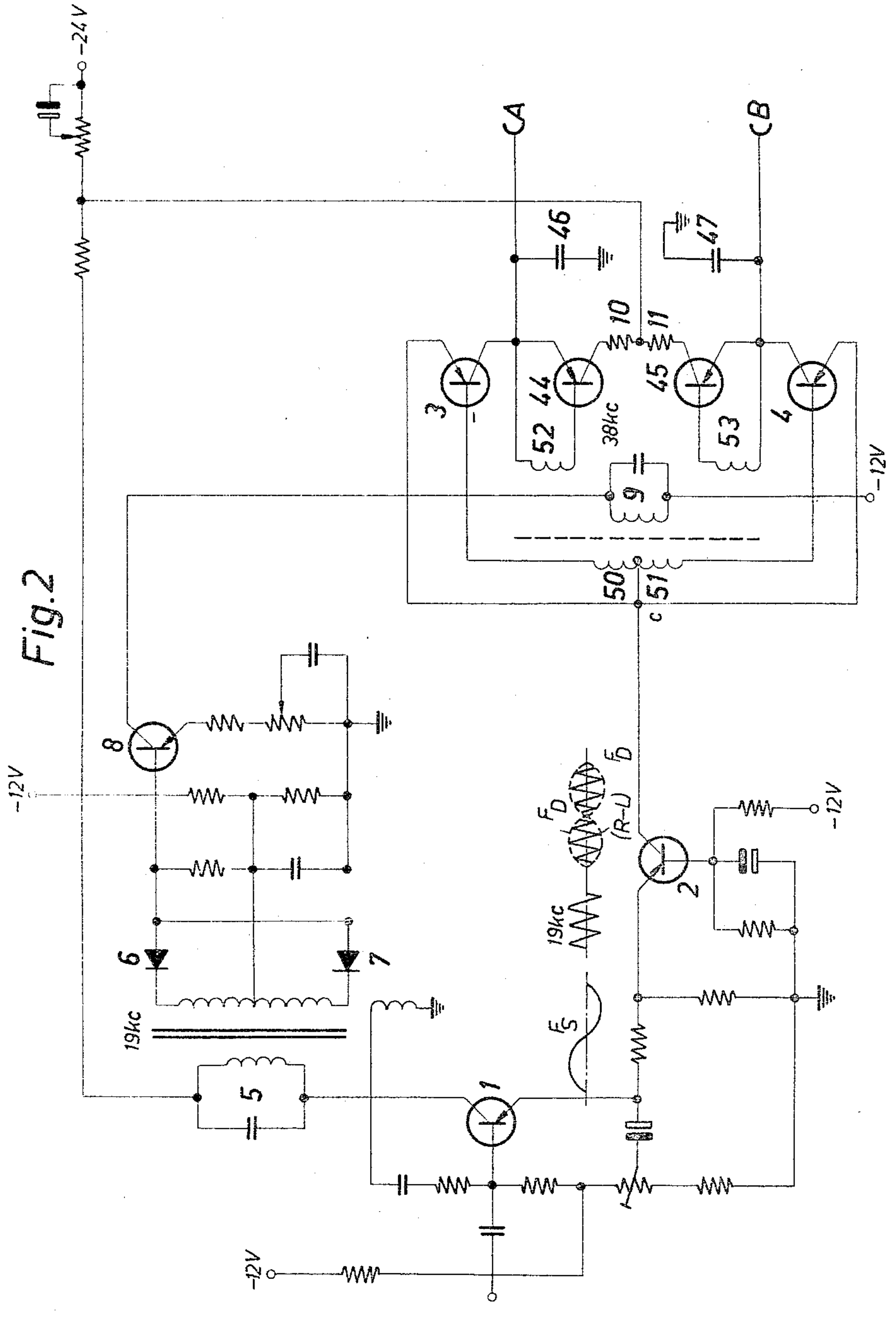
FIGURE 2 illustrates a modification of the circuit of FIGURE 1, wherein a four transistor push-pull circuit is used.

The circuit arrangement shown in FIGURE 2 differs from that of FIGURE 1 only in the part to be found on the right at the bottom, so that the remaining part need only be briefly described.

On the left in FIGURE 2 the signal demodulated by the ratio detector of the receiver (not shown), and tapped in front of the well-known de-emphasis device, is fed to the transistor 1, and on the right the two loudspeaker signals are tapped from the channels A and B. The whole of the stereophonic signal coming from the ratio detector appears (with almost the same amplitude as at the ratio detector) at the emitter of the transistor 1 and is then passed via the transistor 2 and the point *c* to the four switching transistors 3, 4, 44, 45.

From the entire stereophonic signal occurring at the collector of transistor 1, the oscillating circuit 5 selectively passes the pilot frequency signal $F_P$ (19 kcs.) which is then doubled in frequency with the aid of the rectifiers 6 and 7. The intermediate carrier obtained by frequency doubling is amplified in the transistor 8 and passed via the resonant circuit 9 to the base electrodes of the four transistors. The coil of the resonant circuit 9 is wound on the core of a transformer, on which the other four windings are also wound, which supply the control voltages for the base electrodes of the four transistors. The 38 kcs. intermediate carrier therefore sets the switching frequency for the four transistors. When the two transistors 3 and 44 are conducting, the transistors 4 and 45 are non-conducting, and vice versa. The effect of the additional transistors 44 and 45 is that the intermediate carrier of 38 kcs. can not reach the outputs A and B. When the transistor 3 is non-conducting, the condenser 46 is disconnected from the collector resistance 10, so that the condenser 46 can not be charged during the non-conducting state of the two transistors. The same thing applies as regards the condenser 47 and the collector resistance 11, due to the action of the transistor 45. In the case of monaural operation, the decoder of FIGURE 2 can not be used, because the four switching transistors are non-conducting in the absence of the intermediate carrier, there being no bias voltage between the base and emitter electrodes.

The circuit arrangement shown in FIGURE 3 differs from that of FIGURE 2 in that the two transistors 44 and 45 are of the opposite type of conductivity from transistors 3 and 4, for instance npn transistors instead of pnp transistors. The sequence of transistor 44 and collector resistance 10 can therefore be changed around, and likewise the sequence of 45 and 11, so that the control windings for the base electrodes of the transistors 44 and 45 can be connected together. For this reason, the base currents of all four transistors can generate a bias voltage at the resistance 48. Alternatively, the resistance 48 can be omitted, i.e., the line can be interrupted there, and instead of it the resistances 15 and 49 provided, at which the base currents generate the auxiliary voltages. These auxiliary voltages permit monaural operation with the decoder, because all four switching transistors are conducting in their rest state. All of the windings in FIGURE 3 are wound, as in FIGURE 2, on a common transformer core.

In FIGURE 4, the four switching transistors 3, 4, 44, 45, are operated only as alternating current switches. At the output of the transistor 2 there is therefore a condenser 54, which blocks direct current. The transistor 2 has an associated collector resistor 55. In channel A the two transistors 3 and 44 are in series and are of opposite polarity. The same applies to the transistors 4 and 45 in channel B. The circuit will also operate if the collector and emitter of each of the four transistors is reversed. Control winding 50 is associated with transistors 3 and 44; it switches them at a rate equal to the intermediate carrier frequency. The two transistors 3 and 44 are simultaneously non-conducting or conducting. The transistors 4 and 45 are controlled by the winding 51 and operate in phase opposition to the transistors 3 and 44. They are likewise simultaneously non-conducting or conducting. The intermediate carrier does not appear at the outputs A and B, because the windings 50 and 51 are in the bridge diagonal of the relevant transistors forming a bridge circuit. On the output side the condenser 56 serves to block the direct current. Via the line 57, similarly to the circuit of FIGURE 1, the compensating voltage from the transistor 1 (FIGURE 2) is passed to the channels A and B, so that in the two channels A and B the correct amplitude ratio between sum and difference signals is present. The advantage of the circuit arrangement of FIGURE 4 resides in the fact that the windings 52 and 53 in FIGURES 2 and 3 are dispensed with. The circuit arrangement according to FIGURE 4 is not, however, usable for monaural operation.

FIGURE 5 shows a coding circuit for the transmitter end, which differs from the decoding circuit according to FIGURE 4 only in that input and out are changed around. At the input end (left) are the channels A and B, and on the right is the output which leads to the modulator of the transmitter. The effect of the circuit is that the two channels A and B are passed alternately to the output in the cadence of the auxiliary carrier frequency of 38 kcs. This circuit arrangement is, for instance, suitable for stereo signal generators.

Figure 6:
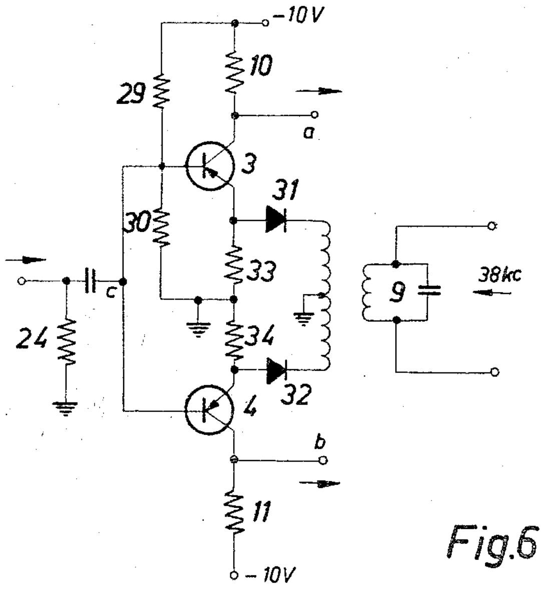
FIGURES 6 to 9 show decoders wherein the transistors are connected to operate as amplifiers in one of their states.

The circuit arrangements according to FIGURES 6 to 9 improve the decoder of FIGURE 1 by increasing its amplification. The transistors acting as electronic switches are switched in such a way, and in the open state are brought to an operating point such that they then operate as amplifiers. There are two ways in which the transistors may be operated:

(a) The transistors are open (in the gating sense) in the undriven state as in the example of FIGURE 1, and are periodically switched to the blocked state by the intermediate carrier (FIGURE 6). Then, as in FIGURE 1, no switching over the decoder is necessary, for monaural operation, because it is permissible in the absence of the intermediate carrier.

Figure 7:
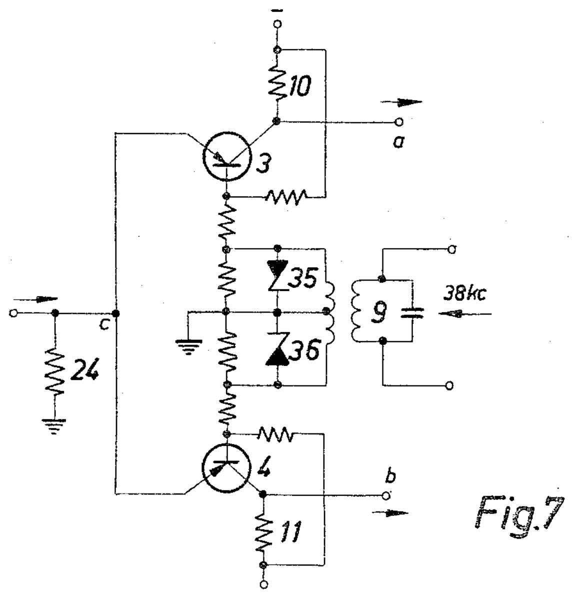
Figure 8:
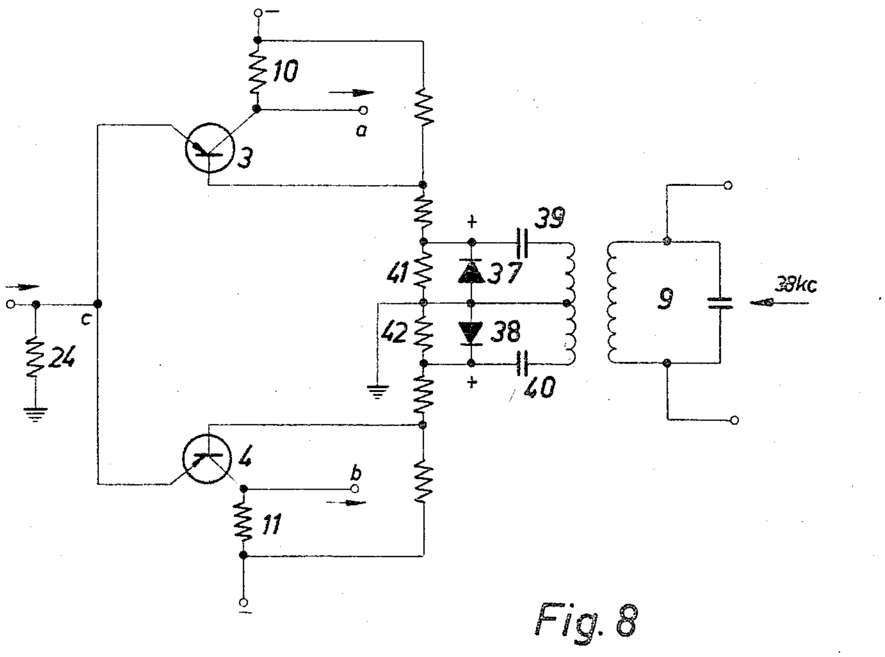
Figure 9:
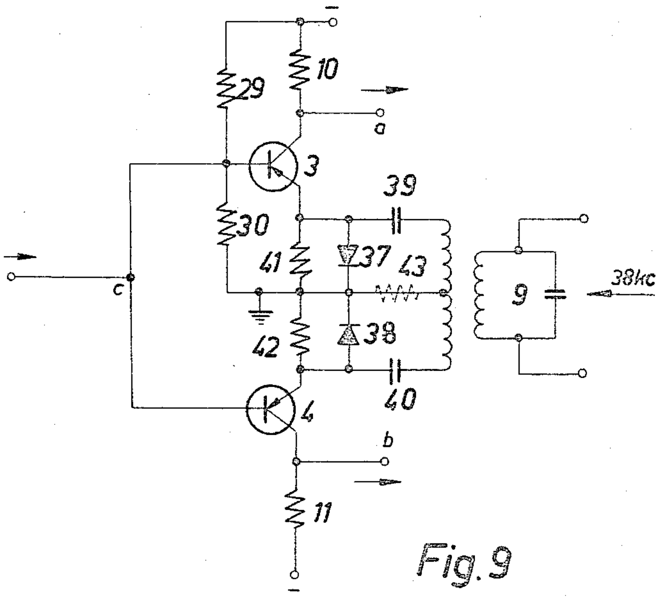

(b) The transistors are blocking in the undriven state and are periodically opened by the intermediate carrier (FIGURES 7 to 9). In the simplest case, the decoder then has to be switched over on changing to monaural operation. An advantage is gained, however, in that the possibility of cross-talk between the two channels is far less, because one channel at a time is definitely closed (undriven state). If, on the other hand, the two transistors are opened in the state of rest, and each transistor is periodically blocked by the sinusoidal intermediate carrier signal, each transistor is blocked so slowly, due to the shape of the sinusoid that temporarily, viz., at the beginning and end of a half-cycle, both transistors are conducting, which is tantamount to cross-talk. According to a further development of the invention, however, these advantages (no switching over necessary to change to monaural operation and minimization of cross-talk) can be obtained in the same embodiment if the actuating voltage for the transistors is generated by peak rectification of the intermediate carrier signal, the peak rectified wave then being used to open the transistors.

FIGURES 6 to 9 show only the stage with the switching transistors 3 and 4. FIGURE 6 relates to the case (a) and FIGURES 7 to 9 to case (b). In FIGURE 6, an amplifier stage is represented with the switching transistors 3 and 4. On the left is the input with the resistance 24, which is the emitter resistance of the input stage of the decoder. The intermediate amplifier stage (2) which is provided in FIGURE 1 is omitted here, because the switching transistors 3 and 4 are utilized as amplifiers. The input of the switching stage is designated *c* as in FIGURE 1, and the two outputs are designated *a* and *b*. The resistances 29 and 30 form a base voltage divider which is common to the two transistors 3 and 4. The collector resistances of the transistors 3 and 4 are denoted by 10 and 11. The intermediate carrier of 38 kcs., obtained by frequency doubling of the pilot frequency, is passed to the oscillating circuit 9 and rectified by the rectifiers 31 and 32 with the appropriate load resistances 33 and 34. The purpose of these rectifiers is as follows. The transistors 3 and 4 are opened in the state of rest, or undriven state (as in FIGURE 1), and adjusted to an operating point that is suitable for amplification. The half-oscillations admitted by the rectifiers 31 and 32 of the intermediate carrier block the two transistors alternately. In order, however, to prevent the operating point of the other opened transistor from being shifted to a zone unfavorable for amplification, in the sense of a further opening of the transistor, the rectifiers 31 and 32 suppress the other half-oscillation. The circuit arrangement of FIGURE 6 has, like that shown in FIGURE 1, the advantage that in changing to monaural operation the decoder does not have to be switched over, because the transistors 3 and 4 operate as amplifiers in the state of rest. It is nevertheless a drawback that due to the sinusoidal form of the intermediate carrier, the blocking of the transistors 3 and 4 does not take place abruptly, but slowly, so that for a short while the two transistors 3 and 4 are both amplifying and a certain cross-talk occurs, as mentioned above.

In FIGURE 7, as in the figures following (but in contrast to FIGURE 6) the switching transistors 3 and 4 are blocked in the state of rest (by a negative direct voltage at the resistance 24) and are periodically opened by the intermediate carrier of 38 kcs. The two base voltage dividers, which are between ground and the negative pole of the source of bias voltage, are designed to provide this blocking action. In this case, no diodes are needed for rectifying the intermediate carrier, because upon the opening of one transistor by one half-cycle, the other transistor is only controlled in the sense of a more intensive blocking. Nevertheless, it is desirable to limit the amplitude of the intermediate carrier, so that if its amplitude should fluctuate, the two transistors 3 and 4 are only opened as far as the most favorable operating point for amplification. For this purpose, in FIGURE 7 the Zener diodes 35 and 36 are provided.

Due to the blocked state of the switching transistors 3 and 4 in FIGURE 7, in the state of rest, the decoder presents a high impedance in the state of rest, and must therefore be by-passed for monaural operation by means of a switch. The circuit arrangement according to FIGURE 7 has, however, the advantage that cross-talk is reduced, because the two transistors 3 and 4 can never open at the same time.

In FIGURE 8, the two base voltage dividers (in contrast to FIGURE 7) are designed so that the transistors are opened in the absence of an intermediate carrier. They are nevertheless blocked by an initial voltage which is obtained by rectification of the intermediate carrier in the rectifiers 37 and 38. Rectification is a peak rectification, because the direct voltages occurring at the load resistances 41 and 42 charge the condensers 39 and 40 in the well-known manner. The direct voltages occurring at the load resistances 41 and 42 are positive and greater than the negative initial voltages occurring at the base electrodes when the intermediate carrier is absent, so that the transistors are blocked. The rectifiers 37 and 38 are temporarily and alternately opened by the voltage peaks of the negative half cycles of the intermediate carrier, so that at the load resistances 41 and 42 a negative voltage occurs temporarily. Therefore the negative bias set at the base electrodes in the absence of the intermediate carrier, plus a further small negative initial voltage, causes transistors 3 and 4 to open alternately. This circuit arrangement has a number of advantages. On changing to monaural operation, the decoder no longer has to be switched over, because the initial voltage voltage switched on by the intermediate carrier is dispensed with for monaural operation and thereby the transistors 3 and 4 are opened. Moreover, the risk of cross-talk is slight, because in the presence of an intermediate carrier the transistors are blocked in the state of rest and therefore there can be no temporary simultaneous opening of the two transistors. The risk of cross-talk is even further reduced, because the transistors are respectively only opened by the peaks of the half-cycles of the intermediate carrier, i.e., only during a portion of the period of a half-oscillation. Therefore, even if the phase of the intermediate carrier is incorrect, which may be caused by the circuit arrangement for obtaining the intermediate carrier, in the receiver, no cross-talk can occur.

In the case of premature or delayed opening of the two channels A and B, the wrong signal can never reach the channels.

The circuit arrangement of FIGURE 9 differs from that of FIGURE 8 in that the stereophonic signal at point *c* is not passed to the emitters, but to the base electrodes (as in FIGURE 6), and the periodic opening of the transisters 3 and 4 by the intermediate carrier takes place at the emitter electrodes instead of at the base electrodes. The advantage of this is that the load resistances 41 and 42 of the rectifiers 37 and 38 cause a feedback, during monaural operation, and therefore reduce amplification. This is desirable, because with monaural operation, the amplification of the decoder is greater than with stereo operation, although approximately equal amplification is desired. The resistance 43 which is shown in dotted lines is intended to prevent the condensers 39 and 40 (for the high audio-frequencies) from acting as shunts for the feedback resistances 41 and 42, during monaural operation, thus preventing over-emphasis of the high frequencies.

It will be understood that the above description of the present invention is susceptible to various modifications, changes and adaptations, and the same are intended to be comprehended within the meaning and range of equivalents of the appended claims.

What is claimed is:

1. In a circuit arrangement for receiving compatible broadcast multiplexed stereophonic signals, in which the main carrier is modulated with (1) a sum signal, (2) an intermediate carrier frequency on which the low frequency difference signal is amplitude modulated with carrier suppression, and (3) a pilot frequency equal to half the intermediate carrier frequency, all of which comprise the whole stereophonic signal, said circuit arrangement comprising, in combination:
- (a) an input for providing the whole stereophonic signal;
- (b) frequency doubling means connected to said input for deriving from the whole stereophonic signal an intermediate carrier signal of twice the pilot frequency and in phase therewith;
- (c) an electronic switch, including
  - (1) first and second switching transistors each having input, output and control terminals,
  - (2) circuit means for feeding the whole stereophonic signal from the input to the input terminals of each of the switching transistors, and
  - (3) further circuit means feeding the output of the frequency doubling means to the control terminals of the switching transistors for alternately turning the switching transistors on and off, in phase opposition to each other, at a rate equal to the intermediate carrier frequency;
- (d) left and right audio output channels connected to receive signals respectively from the first and second switching transistor output terminals; and
- (e) means connected to the input for feeding a portion of the sum signal to each audio output channel to equalize the amplitude of the sum and difference signals.

2. A device as defined in claim 1, wherein the input, output and control terminals are, respectively, the emitter, collector and base terminal of the switching transistors.

3. A device as defined in claim 2 wherein the left and right audio output channels include, respectively, first and second filter means connected to the collectors of the first and second switching transistors, respectively, for filtering out the intermediate carrier signal from the collector signals.

4. A circuit arrangement as defined in claim 3, further including means for feeding a bias current to the bases of the first and second transistors for rendering the transistors conductive in the absence of the intermediate carrier signal.

5. A circuit arrangement as defined in claim 3 wherein the portion of the sum signal which is fed to each audio output signal to equalize the sum and difference signal amplitudes is fed to a point common to the first and second collector circuits, and wherein said circuit means includes an input amplifier stage and a further amplifier stage preceding the switching transistors.

6. A circuit arrangement as defined in claim 2, further including third and fourth switching transistors for forming, with the first and second switching transistors, a double push-pull circuit.

7. A circuit arrangement as defined in claim 6 wherein the first and third switching transistors are connected emitter to emitter, and the collector of the third switching transistor is connected to one of the output channels; the second and fourth switching transistors are connected emitter to emitter and the collector of the fourth switching transistor is connected to the other output channel; and wherein the further circuit means includes first circuit means for applying the intermediate carrier to the bases of the first and third switching transistors, and second circuit means for applying the intermediate carrier to the bases of the second and fourth switching transistors, so that the pairs of switching transistors are alternately turned on and off by the intermediate carrier signal.

8. A circuit arrangement as defined in claim 2 including means for biasing the first and second switching transistors to act as amplifiers in the open state.

9. A circuit arrangement as defined in claim 8, wherein the open state is the undriven state, and where the transistors are periodically driven to the blocked state by the intermediate carrier signal.

10. A circuit arrangement as defined in claim 9, wherein the further circuit means includes a rectifier.

11. A circuit arrangement as defined in claim 8, wherein the transistors are blocked in the undriven state, and are periodically driven to the open state by the intermediate carrier signal.

12. A circuit arrangement as defined in claim 11 wherein the further circuit means includes an amplitude limiter for regulating the intermediate carrier voltage.

13. A circuit arrangement as defined in claim 11, wherein the further circuit means includes means for peak-rectifying the intermediate carrier, the peak currents produced by said rectifier being used to open the switching transistors.

14. A circuit arrangement as defined in claim 13 wherein the peak rectifier includes load resistances connected in series with the emitter terminals of the switching transistors for reducing the amplification of the switching transistors sufficiently during monaural operation so that the monaural and stereophonic amplification factors are approximately equal.

15. A compatible broadcast multiplexed stereo coding cuit for coding stereo input signals and feeding them to a modulator, said coding circuit comprising, in combination:

a left stereo channel input;

a right stereo channel input;

first and second pairs of transistors, the transistors of each pair being connected emitter to emitter, each of the stereo channel inputs being connected to the collector of one of the transistors of a pair, and the other collectors being connected together in an output circuit;

a first base circuit connected connected between the common emitters and common bases of the first transistor pair;

a second base circuit connected between the common emitters and the common bases of the second transistor pair; and means for applying a sinusoidal intermediate carrier signal to the first and second base circuits, so that the first and second transistor pairs alternately pass the left and right stereo channels to the output circuit.

16. In a circuit arrangement for receiving compatible broadcast multiplexed stereophonic signals, in which the main carrier is modulated with (1) a sum signal (2) an intermediate carrier frequency on which the low frequency difference signal is amplitude modulated with carrier suppression, and (3) a pilot frequency equal to half the intermediate carrier frequency, all of which comprise the whole stereophonic signal, and in which the pilot frequency is frequency doubled and applied to an electronic switch for passing the whole stereophonic signal alternately to the left and right audio output channels at a rate equal to the intermediate carrier frequency, and a portion of the sum signal is fed to each channel to equalize the amplitude of the sum and difference signals, the improvement wherein the electronic switch comprises, in combination:

first and second switching transistors;

means feeding the whole stereophonic signal to the emitters of each of the switching transistors; and means feeding the intermediate carrier to the bases of the switching transistors for alternately turning them on and off, in phase opposition to each other.

References Cited by the Examiner

UNITED STATES PATENTS

| | | | |
|---|---|---|---|
| 3,129,288 | 4/1964 | De Vries | 179—15 |
| 3,167,615 | 1/1965 | Wilhelm et al. | 179—15 |
| 3,258,537 | 6/1966 | Procter et al. | 179—15 |

DAVID G. REDINBAUGH, *Primary Examiner.*

ROBERT L. GRIFFIN, *Assistant Examiner.*